United States Patent
Yamazaki

(10) Patent No.: US 6,628,628 B1
(45) Date of Patent: Sep. 30, 2003

(54) WIRELESS COMMUNICATION HAVING OPERATION TIME CORRECTING FUNCTION

(75) Inventor: Toru Yamazaki, Chita (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/516,154

(22) Filed: Mar. 1, 2000

(30) Foreign Application Priority Data

Mar. 19, 1999 (JP) .......................................... 11-075888

(51) Int. Cl.⁷ .............................................. H04B 7/216
(52) U.S. Cl. ...................... 370/320; 701/213; 455/12.1; 455/13.2; 370/507
(58) Field of Search ................................ 370/319, 320, 370/322, 324, 335, 336, 342, 328, 347, 350, 503, 507, 509, 510, 512; 455/456, 3.2, 11.1, 12.1, 13.2; 342/356, 358; 701/207, 213, 214, 215; 375/145, 149, 356, 358, 367

(56) References Cited

U.S. PATENT DOCUMENTS

| | | | | |
|---|---|---|---|---|
| 5,999,126 | * | 12/1999 | Ito | 342/357.1 |
| 6,097,974 | * | 8/2000 | Camp | 455/575 |
| 6,236,359 | * | 5/2001 | Watters | 342/357.1 |
| 6,236,832 | * | 5/2001 | Ito | 455/6.3 |
| 6,285,316 | * | 9/2001 | Nir | 342/357.09 |
| 6,363,240 | * | 3/2002 | Ito | 455/3.06 |
| 6,453,172 | * | 9/2002 | Miyahista | 455/552 |

FOREIGN PATENT DOCUMENTS

| | | |
|---|---|---|
| JP | 2-164140 | 6/1990 |
| JP | 9-139989 | 5/1997 |
| JP | 10-163958 | 6/1998 |

OTHER PUBLICATIONS

Snaptrack, Hybrid wireless assisted GPS, Jan. 25, 2002, Irving, Texas.*
Qualcomm CDMA Technologies GPS ONe, Dec. 20, 2001.*
KDDI Launches Third generation CDMA services, Apr. 2, 2002.*

* cited by examiner

*Primary Examiner*—Douglas Olms
*Assistant Examiner*—Ricardo M. Pizarro
(74) *Attorney, Agent, or Firm*—Harness, Dickey & Pierce, PLC

(57) ABSTRACT

An integrated communication system includes a CDMA network and other network such as a private cordless phone network which operates under a communication protocol different from that of the CDMA network. The CDMA network receives a GPS time signal from a GPS satellite and transmits a GPS-synchronization signal in synchronism with the GPS time signal. When a cellular phone receives an output request signal such as a position registration request signal from the other network, it transmits an output signal such as a position registration signal to the other network at a time synchronized with the GPS-synchronization signal. The other communication network responsively corrects a time of synchronization of its operation time based on the received output signal.

7 Claims, 3 Drawing Sheets

WIRELESS COMMUNICATION HAVING OPERATION TIME CORRECTING FUNCTION

CROSS REFERENCE TO RELATED APPLICATION

The present application relates to and incorporates herein by reference Japanese Patent Application No. 11-75888 filed on Mar. 19, 1999.

BACKGROUND OF THE INVENTION

The present invention relates to wireless communication systems and method in which a plurality of different types of communication networks operable under different communication protocols are integrated to enable communications between different types of communication devices.

Mobile communication systems presently used include various communication networks such as an FDMA network operable under a frequency division multiple access (FDMA) protocol, a TDMA network operable under a time division multiple access (TDMA) protocol, a CDMA network operable under a code division multiple access (CDMA) protocol, a cordless phone network and the like. The CDMA network is considered more promising than the FDMA network and the TDMA network, because its provides the highest efficiency with respect to frequency utilization. The CDMA network has its own service area which is more limited than those of the FDMA network and the TDMA network.

It is therefore proposed to provide dual-type cellular phones which are compatible with the CDMA communication protocol and other communication protocols. The cellular phone of this kind operates under the CDMA protocol for communication with other phones as long as it is inside a service area of the CDMA network. The cellular phone operates under the other communication protocol for communication with other phones as long as it is outside the service area of the CDMA network.

The CDMA network has a global positioning system (GPS) receiver at its radio communication cell station to receive a GPS time signal transmitted from a GPS satellite. The received time signal is used to correct system operation synchronization time of the CDMA network based on the GPS time. Thus, the system operation time of the CDMA network can be synchronized very accurately, because the GPS time is very accurate.

Some of the other communication networks use a network synchronization method. That is, those networks correct respective system operation synchronization times based on the reference time of a public communication network which comprises a public switched telephone network (PSTN), an integrated services digital network (ISDN) or the like. The reference time provided in those networks is less accurate than that of the GPS time, and hence the accuracy in synchronizing the system operation time is not high enough. If it is desired to increase the accuracy in synchronizing the system operation times in communication networks other than the CDMA network, GPS receivers are necessitated at the cell stations of those communication networks. The GPS receivers in those other networks thus cause an increase in cost and are not practical.

SUMMARY OF THE INVENTION

It is therefore an object of the present invention to provide a wireless communication which is capable of increasing the accuracy in synchronizing system operation time.

According to the present invention, an integrated communication system is constructed with a plurality of communication networks operable under different communication protocols. The communication networks includes a first network such as a CDMA network and a second network such as a private cordless phone network. The first network receives a GPS time signal from a GPS satellite and transmits a GPS-synchronization signal in synchronism with the GPS time signal. When a cellular phone receives an output request signal such as a position registration request signal from the second network, it transmits an output signal such as a position registration-signal to the second network at a time synchronized with the GPS-synchronization signal. The second communication network responsively corrects a time of synchronization of its operation time based-on the received output signal. As the GPS time signal is generated accurately, the second communication network is enabled to correct its operation time accurately.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

An embodiment of the present invention will be described in detail with reference to a case in which a CDMA (code division multiple access), network and a cordless phone network are integrated. The cordless phone network may be a PHS (personal handy phone system) network which is run privately and has a plurality of cell stations (CS) to provide its service only within a limited area, for instance, company premises.

Figure 1:
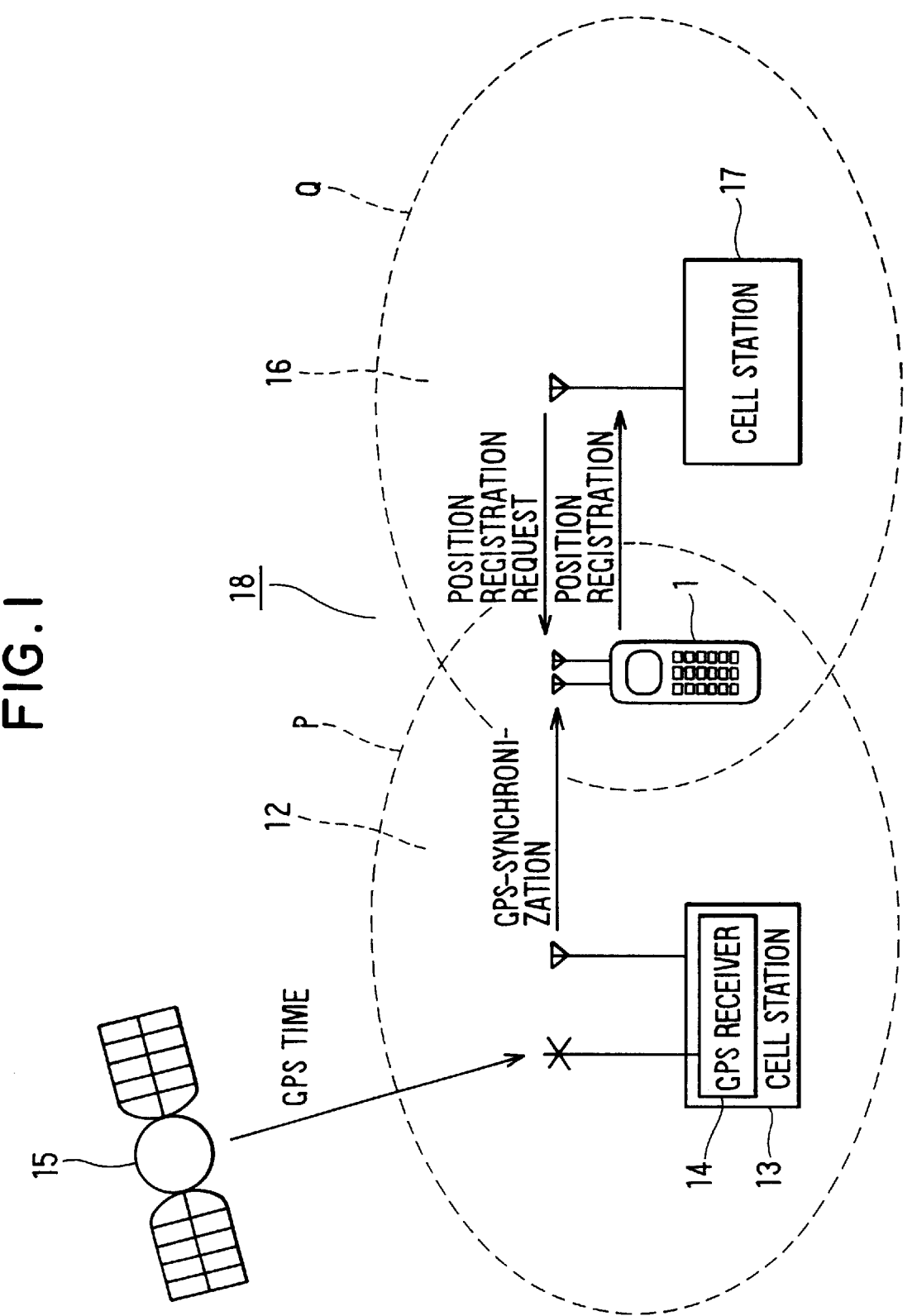
FIG. 1 is a schematic diagram showing a wireless communication system according to a preferred embodiment of the present invention.

Referring first to FIG. 1, a wireless communication device (cellular phone) 1 is shown as operable in both a CDMA network 12 and a private PHS network 16. The CDMA network 12 and the PHS network 16 have respective communication service areas P and Q, and jointly constitute an integrated communication system 18. The CDMA network has a cell station 13 which includes a GPS receiver 14 to receive a GPS time signal from a GPS satellite 15. The PHS network 16 has a cell station 17.

The cell station 13 is constructed to generate a GPS-synchronization signal in synchronism with the reception of the GPS time signal by the GPS receiver 14. The GPS-synchronization signal is transmitted within the service area P of the CDMA network 12. The cellular phone 1 is constructed to receive the GPS-synchronization signal and operate under the CDMA protocol based on the received GPS-synchronization signal, as long as it is within the service area P.

The cell station 17 in the PHS network 16 is constructed to generate and transmit a position registration request signal within the service area Q of the PHS network 16. The cellular phone 1 is further constructed to generate and transmit in return a position registration signal to the cell station 17 when it receives the request signal. Thus, the cell station 17 is enabled to recognize the location of the cellular phone 1.

Figure 2:
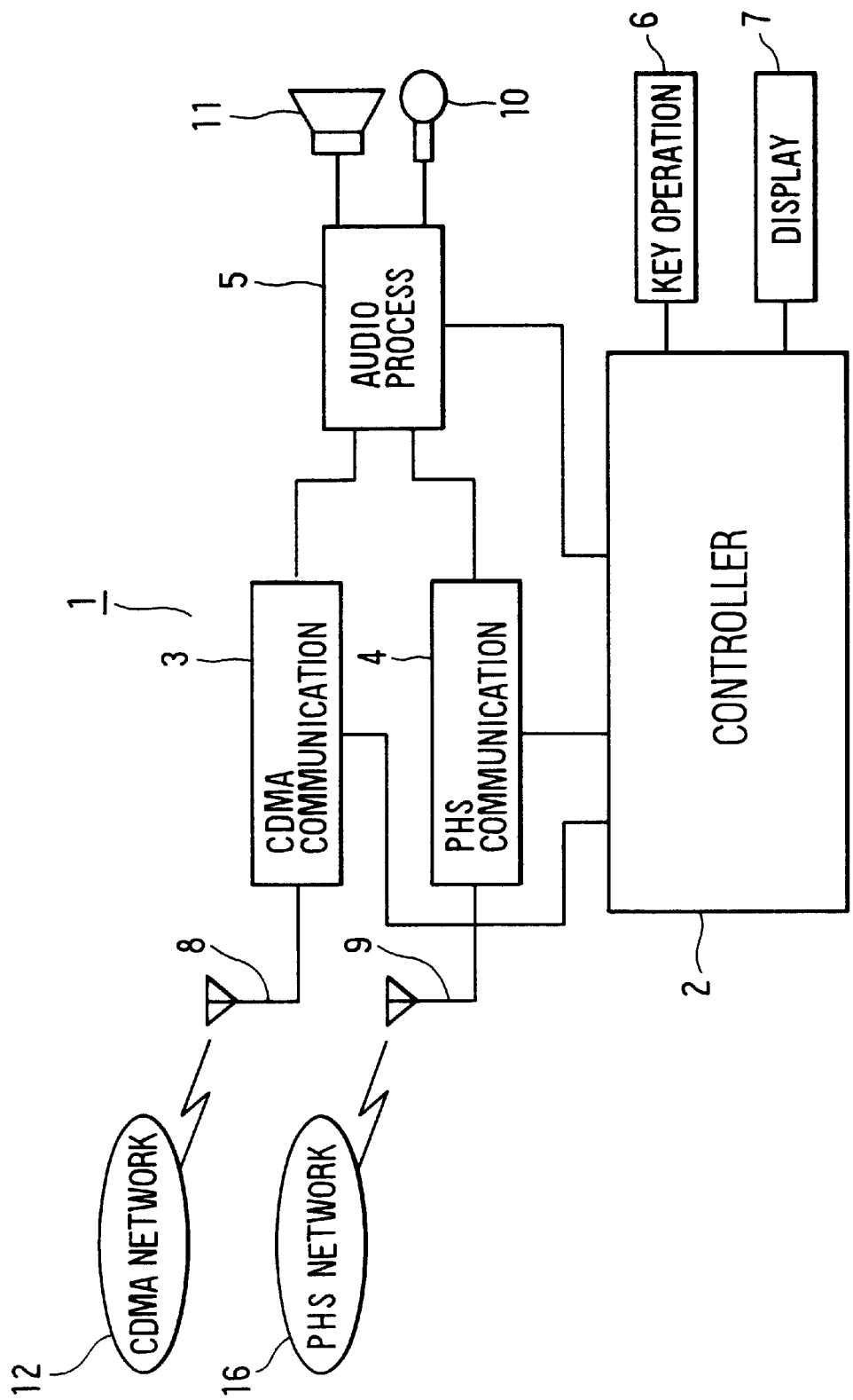
FIG. 2 is a block diagram showing a cellular phone used in the wireless communication system shown in FIG. 1.

Specifically, the cellular phone 1 is constructed as shown in FIG. 2. The cellular phone 1 has a controller 2 such as a programmed microcomputer. The controller 2 is connected to a CDMA communication unit 3 connected to a radio antenna 8, a PHS communication unit 4 connected to a radio antenna, an audio processor unit 5 connected to a microphone 10 and a speaker 11, a key operation unit 6 and a display unit 7. The controller 2 is programmed to control those units.

The CDMA communication unit 3 is constructed to execute communications under the CDMA protocol. That is, it is constructed with a diffusion circuit, a transmission circuit and the like in its signal transmitting side. When it receives a transmission signal from the audio processor unit 5, it subjects the transmission signal to a diffusion processing and a transmission processing on the received transmission signal. The antenna 8 radiates in the CDMA network 12 a radio signal in a CDMA communication frequency band in response to the processed transmission signal.

The CDMA communication unit 3 is also constructed with a receiver circuit, an inverse-diffusion circuit and the like in its signal receiving side. When the antenna 8 receives a radio signal from the CDMA network 12, the CDMA communication unit 3 subjects a received signal to a reception processing and an inverse-diffusion processing and produces the processed signal to the audio processor unit 5.

The PHS communication unit 4 is constructed to execute communications under the PHS protocol. That is, it is constructed with a modulator circuit, a dc/ac modulator circuit, a power amplifier circuit, a transmission circuit and the like in its signal transmitting side. When it receives a transmission signal from the audio processor unit 5, it subjects the transmission signal to a modulation processing, a dc/ac modulation processing, a power amplification processing and a transmission processing on the received transmission signal. The antenna 9 radiates in the PHS network 16 a radio signal in a PHS communication frequency band (for instance, 1.9 GHz band) in response to the processed transmission signal.

The PHS communication unit 4 is also constructed with a receiver circuit, a demodulator circuit and the like in its signal receiving side. When the antenna 9 receives a radio signal from the PHS network 12, the PHS communication unit 4 subjects a received signal to a reception processing and a demodulation processing and produces the processed signal to the audio processor unit 5.

The audio processor unit 5 is constructed with a digital signal processing circuit, audio interface circuit and the like. It generates a transmission signal in response to a voice signal from the microphone 10 after an A/D conversion processing and a voice coding processing, and applies it to either one of the CDMA communication unit 3 and the PHS communication unit 4. It also subjects a processed signal from either one of the CDMA communication unit 3 and the PHS communication unit 4 to a voice decoding processing and a D/A conversion processing to produce a voice signal to the speaker 11, when it receives the processed signal.

The key operation unit 6 has a plurality of keys (buttons) such as a power-on/off key, a communication start key, a communication end key, numerical keys (0 to 9), function keys and the like. It is constructed to produce a key operation signal to the controller 2. The key operation signal varies with the operated key. The controller 2 responsively executes processes in correspondence with the key operation signal. The display unit 7 is constructed to display information in response to control signals applied from the controller 2.

Figure 3:
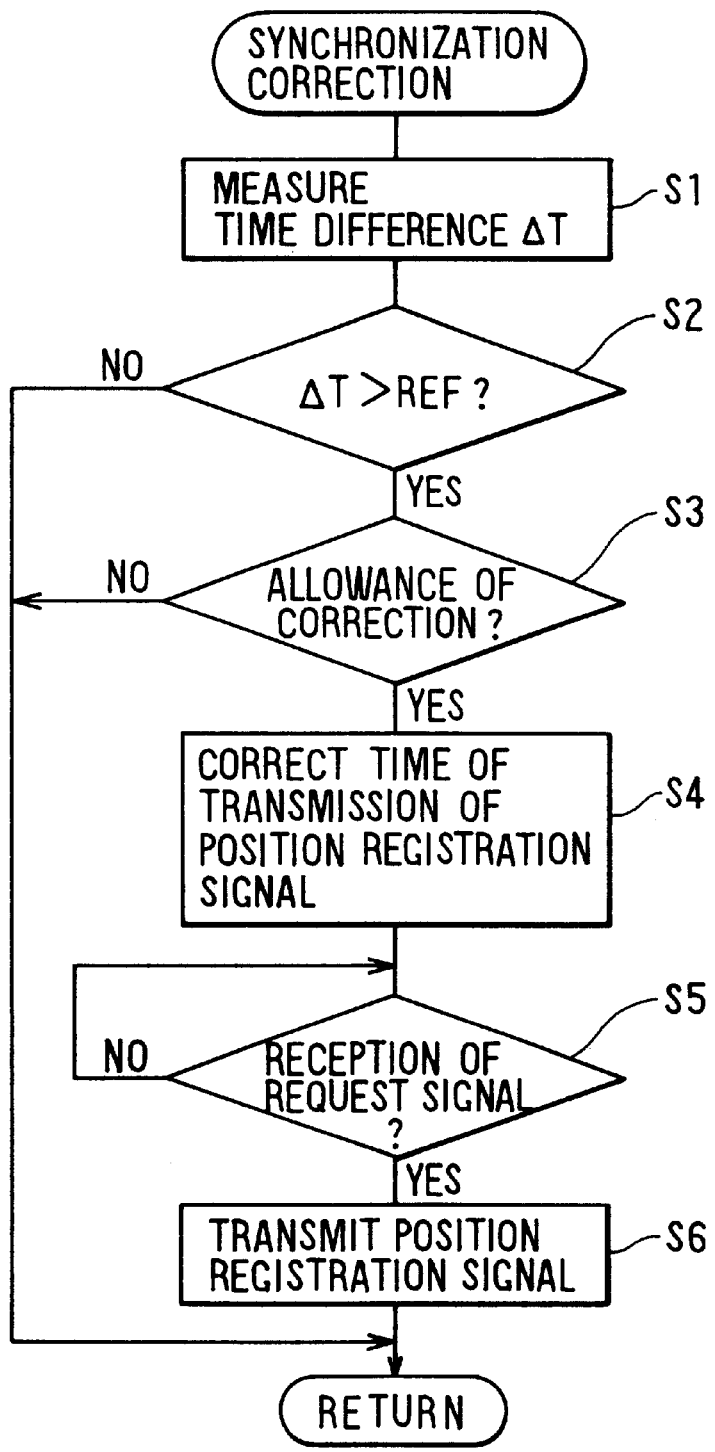
FIG. 3 is a flow diagram showing an operation of the cellular phone shown in FIG. 2.

The controller 2 is programmed to execute communication control programs including a synchronization correction process shown in FIG. 3. This correction process is executed in response to a reception of the GPS-synchronization signal transmitted from the cell station 13 of the CDMA network 12, under the condition that the cellular, phone 1 is within both service areas P and Q of the CDMA network 12 and the PHS network 16.

As shown in FIG. 3, the controller 2 measures at step S1 a difference of times ($\Delta t$) between the reception of the GPS-synchronization signal at the CDMA communication unit 3 and the transmission of the position registration signal from the PHS communication unit 4. The controller 2 then checks at step S2 whether the measured time difference is longer than a comparison reference REF. If the check result is YES, the controller 2 further checks at step S3 whether a time correction is allowed. The allowance/non-allowance of the time correction may be set in advance by a user's key operation on the cellular phone 1.

If the check result at step S3 is YES, the controller 2 corrects the time of transmitting the position registration signal from the PHS communication unit 4 to the cell station 17 of the PHS network 16, so that the transmission of the position registration signal will be synchronized with the reception of the GPS-synchronization signal from the cell station 13 of the CDMA network 13.

The controller 2 checks at step S5 whether the cell phone 1, particularly the PHS communication unit 4, has received the position registration request signal from the cell station 17. If the check result is YES, the controller 2 causes at step S6 the PHS communication unit 4 to transmit the position registration signal in return to the request signal at the corrected time synchronized with the GPS-synchronization signal.

When the cell station 17 receives the position registration signal transmitted as above from the cellular phone 1, it transmits the next position registration request signal in synchronized relation with the reception of the position registration signal. Thus, the time of transmitting the position registration request signal from the cell station 17 of the PHS network 16 is synchronized with the time of transmitting the GPS-synchronization signal from the cell station 13 of the CDMA network 12.

Here, the cell station 13 transmits the GPS-synchronization signal in synchronism with the GPS time signal received from the GPS satellite 15 which is highly accurate. Therefore, the cell station 17 of the PHS network 16 is enabled to transmit the position registration request signal at highly accurate time. Thus, the accuracy in synchronizing the system operation time of the PHS network 16 can be increased.

According to the above embodiment, the controller 2 of the cellular phone 1 corrects the time of transmission of the position registration signal from the PHS communication unit 4 to be synchronized with the time of receiving the GPS-synchronization signal when the CDMA communication unit 3 of the cellular phone 1 receives the GPS-synchronization signal from the CDMA network 12. The controller 2 causes the PHS communication unit 4 to transmit the position registration signal to the cell station 17 of the PHS network 16 at the corrected time when the PHS communication network 4 receives the position registration request signal transmitted from the cell station 17. The cell station 17 of the PHS network 16 corrects the synchronization of the system operation time based on the position registration signal when it receives the position registration signal transmitted from the cellular phone 1.

As described above, the PHS network 16 is enabled to correct its time of synchronization based on the position registration signal which is synchronized with the highly accurate GPS-synchronization signal. As a result, the PHS network 16 does not require any GPS receivers therein.

In the above embodiment, the cellular phone 1 may be designed to transmit another signal (for instance, a link signal for establishing a link) other than the position registration signal in synchronism with the GPS-synchronization signal. In this instance, the cell station 17 in the PHS network 16 is designed to operate to synchronize its operation time with this another signal.

Further, a car phone or the like may be used as the wireless communication device in place of the cellular phone 1. Any other circuit units maybe used in place of the CDMA communication unit 3 as long as it is capable of receiving the GPS-synchronization signal synchronized with the GPS time signal. The PHS network 16 may be replaced with any other communication networks operable under other communication protocols such as FDMA or TDMA protocol. The antennas of the cellular phone 1 may be integrated into a single common antenna.

The present invention should not be limited to the above embodiment and modifications, but may be modified in various other ways without departing from the spirit of the invention.

What is claimed is:

1. A wireless communication system using a GPS time signal from a satellite comprising:
   a plurality of communication networks including a first network operable under a first communication protocol and capable of transmitting a GPS-synchronization signal in synchronism with the GPS time signal, and a second network operable under a second communication protocol different from the first communication protocol; and
   a communication device operable to communicate with the first network and the second network under the first communication protocol and the second communication protocol, respectively, and including a receiving part which receives the GPS-synchronization signal from the first network, a transmitting part which transmits an output signal to the second network, and a controlling part which synchronizes a time of transmission of the output signal from the transmitting part to the GPS-synchronization signal,
   wherein the second network is constructed to correct a synchronization of operation time thereof based on the output signal received from the communication device.

2. A wireless communication system of claim 1, wherein: the transmitting part is constructed to transmit the output signal as a position registration signal in return of a request signal received from the second network.

3. A wireless communication system of claim 1, wherein:
   the first network is constructed to operate under a code division multiple access method as the first communication protocol; and
   the second network is constructed as a privately-owned cordless phone communication network to operate only within private premises.

4. A wireless communication device for use in an integrated communication system of a plurality of communication networks operable under different communication protocols, one of the networks being capable of transmitting a GPS-synchronization signal in response to a GPS time signal from a GPS satellite, the device comprising:
   a receiving part for receiving the GPS-synchronization signal from the one of the communication networks;
   a transmitting part for transmitting an output signal to another of the communication networks; and
   a controlling part which synchronizes a time of transmission of the output signal from the transmitting part to the GPS-synchronization signal received by the receiving part, so that the another of the communication networks may correct a synchronization of operation time thereof based on the output signal.

5. A wireless communication device of claim 4, wherein:
   the one of the communication network is constructed to operate under a code division multiple access protocol; and
   the second network is constructed as a privately-owned cordless phone communication network to operate only within a private premises.

6. A wireless communication method using a GPS time signal transmitted from a GPS satellite comprising:
   receiving the GPS time signal and transmitting a GPS-synchronization signal in synchronism with the received GPS time signal in a first communication network which is operable only under a code division multiple access protocol;
   receiving the GPS-synchronization signal and transmitting an output signal in synchronism with the received GPS-synchronization signal in a cellular phone which is operable under both of the code division multiple access protocol and another protocol different from the code division multiple access protocol; and
   receiving the output signal and correcting a time of synchronization of operation time in a second communication network which is operable only under the another protocol.

7. A wireless communication method of claim 6, wherein:
   the second communication network transmits to the cellular phone a request signal which requests a transmission of the output signal; and
   the cellular phone transmits the output signal in response to the request signal.

* * * * *